Figure 1:
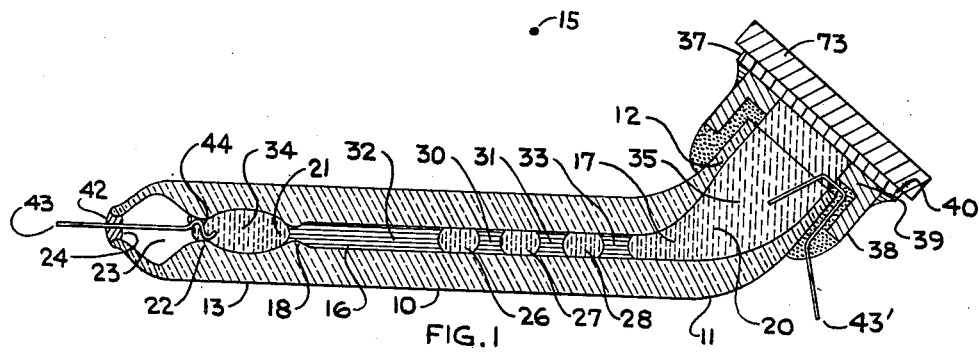

Jan. 1, 1952 H. W. ASHTON 2,581,066
ELECTROMETER TRANSDUCER WITH DUAL MODE OF OPERATION
Filed Aug. 12, 1948

INVENTOR
HOWARD W. ASHTON
BY Robert L Kahn
ATTORNEY

Patented Jan. 1, 1952

2,581,066

UNITED STATES PATENT OFFICE 2,581,066

ELECTROMETER TRANSDUCER WITH DUAL MODE OF OPERATION

Howard W. Ashton, South Ardmore, Pa., assignor to Oliver W. Storey, trustee for the partnership of O. W. Storey & Associates, Chicago, Ill.

Application August 12, 1948, Serial No. 43,941

19 Claims. (Cl. 179—100.41)

This invention relates to a transducer and more particularly to a capillary electrometer type of transducer. In United States Patent 2,407,363 issued to Bussey on September 10, 1946, there is disclosed an inertia type of capillary electrometer transducer. This invention is an improvement upon this general type of transducer and provides a structure which is simple, small, compact and has an extended frequency response, particularly for low frequencies.

In distinction to electromagnetic or electrodynamic type of transducer, in a capillary electrometer type of transducer, the generation of an electric potential is a function of amplitude of movement rather than velocity. To that extent the capillary electrometer type of transducer bears some resemblance to the piezocrystal type of transducer. In a capillary electrometer the container wall as a resistance or impedance is a shunt across the capillary element and this resistance must be high enough to reduce leakage of current to a value low in comparison to the current flow during transducer action. Inasmuch as it is possible to use glass or other materials whose surface resistance is high enough to maintain an electric charge for hours, the problem of current leakage in a capillary electrometer is not important.

Transducer action in a capillary electrometer results from the relative motion of the interface and insulating envelope forming the capillary channel, so that to a degree it is unimportant which of these two is moved. This will be explained further. In an inertia type of transducer it is clear that the friction between the envelope and liquid mass is of great importance in determining low frequency transducer characteristics. The smaller the friction, the less the acceleration that is required for obtaining relative movement between the liquid and envelope. It has been found that in an inertia type of transducer, such as disclosed in the Bussey patent, that friction between liquid and envelope prevents the full utilization of a capillary electrometer at low frequencies of the order of several hundred cycles per second or less. This invention provides a structure wherein inertia action for the transducing element is modified so that satisfactory transducer action is possible down to any desired low frequency. In fact, by virtue of the invention, a capillary electrometer transducer having modified inertia action may be made to operate down to a few cycles per second. Inasmuch as an inertia type transducer operates in a highly desirable manner at high frequencies, this invention makes it possible to provide a capillary electrometer type transducer having an extended frequency response.

A structure embodying the present invention operates as a substantially pure inertia type transducer at frequencies above several hundred cycles per second (the exact value is unimportant and is usually not sharp). Such a property is of importance in a transducer. As is well known, mechanical systems for transmitting vibratory energy at frequencies above about four or five thousand cycles per second are difficult to design. This is due to the fact that mechanical elements have their own resonant frequencies and, since the motional impedance becomes high, efficient transmission becomes difficult. For the above reason, an inertia type of transducer particularly of the capillary electrometer type is highly desirable for high frequencies.

In accordance with this invention, a capillary electrometer is mounted for inertia action and is modified so that at low frequencies a mechanical rather than inertia action is used for active transducer operation. This is accomplished by the simple expedient of having the capillary envelope, moved for transducer action, provided with a flexible wall portion, which wall portion is adapted to cooperate with a fixed stop. By controlling the coupling between the transducer element and the fixed stop, effective transducer action below the range of effective inertia action becomes possible. The lower limit for this composite type of transducer action may be set at any desired point in the frequency range and is generally a function of the mechanical coupling between the fixed stop and liquid as well as the mounting of the entire transducer. It is understood that the lower limit is not sharp but that the output attenuates more or less gradually. Generally an arbitrary half-power point is selected as the characteristic limit. A structure of this character will thus provide transducer operation with what may be termed mechanical action for low frequencies. As the frequency increases, transducer action due to mechanical action drops off while transducer action due to inertia action increases. At higher frequencies, the contribution to transducer action due to the mechanical action drops to practically nothing with inertia action being responsible for substantially all transducer action.

A transducer embodying the present invention has substantial advantages over all types of other transducers of the prior art. Thus the present transducer is susceptible to being made in such physically small dimensions and having such little mass as to be capable of efficient response to the highest frequencies to be handled. The impedance presented by the transducer, inclusive of the stylus, may be made quite small in comparison to prior art transducers. The mechanical simplicity of the transducer, including the drive to the stylus tip, is such that complex modes of energy transmission at high frequencies are practically impossible. A transducer embodying the present invention may operate with needle pressures much lower than any prior art transducer and thus is readily usable on records having fine grooves and low surface speeds.

A capillary electrometer type of transducer having small dimensions has hitherto presented formidable problems in connection with sealing of contents. Due to the minute area and volume of components making up a capillary interface, it takes but little of an impurity to reduce the effectiveness of the electrometer. For this reason, it is desirable that hermetic seals be provided for the electrometer liquid contents. Where electrometers are made of glass and have substantial physical dimensions this does not present any serious problem. However, where a small electrometer is desired, sealing of glass without disturbing the predetermined liquid and gas contents is a serious problem.

It has been found that, at least at one end of the electrometer, the quantity of gas, usually air, must be controlled within limits in order to maintain desired characteristics. While the quantity of gas may be as desired and depends upon the construction and processing of the electrometer, it has been found that maintenance of predetermined characteristics in production requires reasonably accurate control over the gas contents, at least at one end of the electrometer and preferably at both ends. By virtue of the invention disclosed herein, it is possible to construct in quantity capillary electrometers having substantial similarity as to physical transducer characteristics.

For a more complete understanding of the invention reference will now be made to the drawings wherein exemplary embodiments are shown. It is understood, however, that the invention is susceptible to various modifications and changes and is not to be limited except by the claims.

Figure 2:
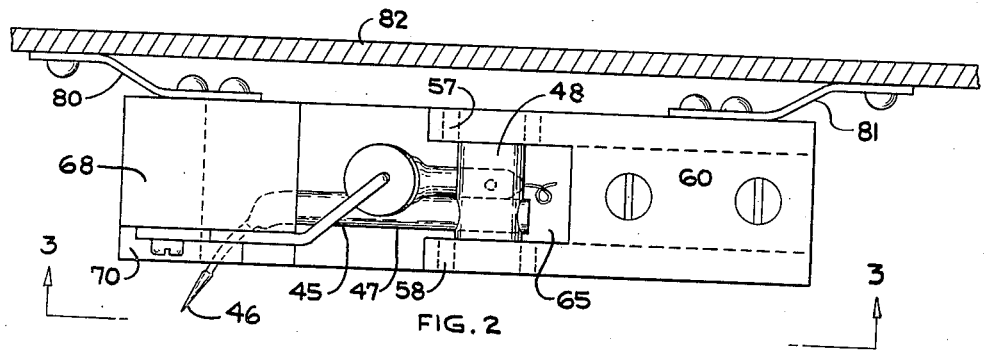
Figure 3:
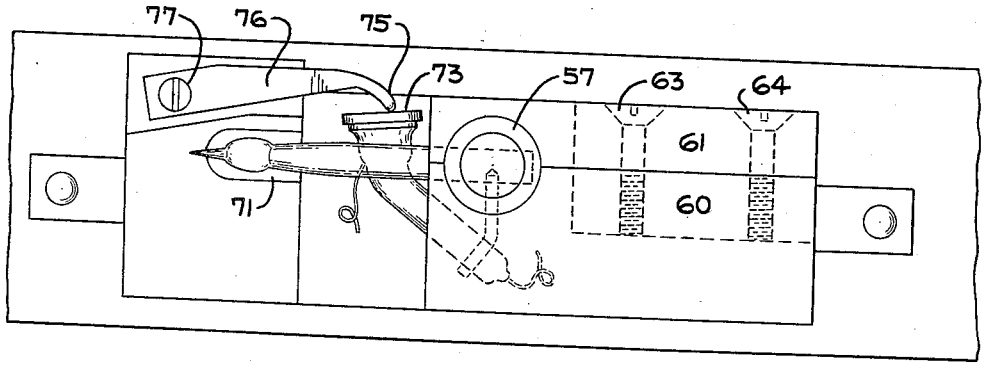
Figure 4:
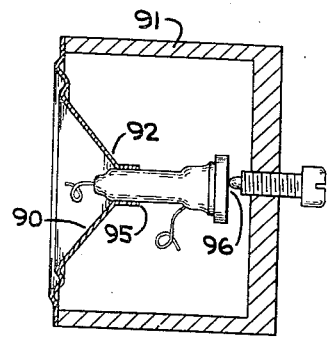
Figure 3A:
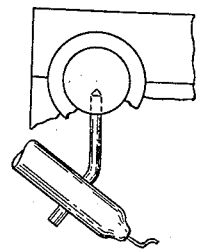

Figure 1 is a section through the center of a transducer element embodying the present invention. Figure 2 is a side elevation of a complete transducer embodying the invention mounted on a support. Figure 3 is a section on broken line 3—3 of Figure 2. Figure 3A is a detail showing the support for the transducer element. Figure 4 is a diagrammatic view of a modified form of transducer utilizing the present invention.

Referring now to the drawings, the capillary electrometer transducer element comprises tube 10 having elbow 11 and end portions 12 and 13 respectively. Tube 10, which is the envelope, must be of insulating material of a sufficiently high electrical resistance for use in such a device and also having a sufficient degree of chemical inertness with respect to the capillary components so that contamination will not result. With respect to electrical resistance, any of the various kinds of glass and plastics and ceramics which are generally regarded as insulators may be used. As far as chemical inertness is concerned, glass is preferred. Where the electrometer liquids include mercury and electrolyte, as sulphuric acid, it is preferred to use glass substantially free of lead. The ordinary types of lead glass tend to reduce the operating life of the electrometer, probably because of electrolytic action involving the lead and capillary liquids. As an example of materials suitable for use in making the envelope the following are hereby given: all glasses substantially free of lead, such as Pyrex, soda-lime, plastics such as Lucite and Plexiglas (both variants of methyl-methacrylate resins).

In general, envelope 10 is to be oscillated with reference to a fixed axis perpendicular to the plane of the drawing and located generally in the region at or near dot 15. Theoretically it would be better to have the entire envelope axis lie along the arc of a circle. In practice, however, this is not necessary and it has been found that bending the envelope to provide the elbow is sufficient. The angle of bend is not critical and, while related to the distance between the bend and axis 15, may vary greatly. In practice, the elbow angle will be substantially greater than 90 degrees and as shown here is about 130 degrees.

Envelope 10 has axial bore 16 having ends 17 and 18 respectively. End 17 of the bore is a connecting region between the bore proper and terminal chamber 20. End 18 of the bore is preferably constricted somewhat with respect to bore 16. Beyond end 18 is small chamber 21 having constricted end 22 communicating with end chamber 23. The envelope is formed so that chamber 23 has inlet opening 24.

While not essential, the cross sections of the various chambers, constrictions, and bore are generally circular and may be formed by conventional glass handling methods. The transverse diameter of bore 16 may vary over a substantial range. It has been found that fine capillary bores are quite sensitive for transducer action and have desirable properties. However, envelopes with fine bores are somewhat difficult to handle particularly with regard to filling properly with liquids. A bore of the order of about five thousandths of an inch has been found to be quite satisfactory for conventional pickup work. This may be reduced to as little as two thousandths of an inch and still work. The thickness of the envelope itself is unimportant and for mechanical reasons should be substantial.

As an example, a soda-lime glass tube having an outside diameter of about sixty thousandths of an inch may be used. A length of about ¼″ measured between ends 17 and 18 is ample. Terminal chamber 20 has a diameter substantially greater than that of bore 16 but the diameter may vary within wide limits. A diameter of about forty thousandths of an inch is ample and will leave sufficient thickness of wall (assuming that the outside diameter of the envelope is uniform throughout its length) for strength. It is of course not necessary to maintain the outside diameter of the envelope material at a constant value. The various dimensions, as will be explained later, all affect the vibration response characteristics and the tolerances will be determined by variations in characteristics.

The length of chamber 20 may also vary and may be of the order of about ⅛ of an inch. Generally the volume of chamber 20 is more important for determining frequency characteristics. In this example, the volume was .004 cc. The length of the elbow portion may be just great enough to provide for the bend. Chambers 21 and 23 may have diameters varying within wide limits and in the example given have diameters of about 10 and 40 thousandths of an inch respectively. The length along the axis of the bore of chambers 21 and 23 is also unimportant and may be of the order of about 1/16 of an inch. Constriction 18 has a diameter somewhat smaller than that of bore 16 and in practice such difference may be of the order of about one or two thousandths of an inch. Constrictions 22 and 24 have no critical dimensions and may conveniently have about the same dimensions as bore 16 or constriction 18.

Disposed within bore 16 of the electrometer are a plurality of mercury globules, here shown as three, 26 to 28 inclusive. It is possible to use one or more globules of mercury. The potential generated by the electrometer increases with the number of interfaces due to separate globules. However, the increase of potential beyond three globules of mercury is negligible particularly if the liquid is moved rather than the envelope so that for practical purposes three such globules are sufficient. As is well known, the mercury must be chemically pure. While certain amalgams such as silver as an example may be used, it is preferred to use pure mercury.

Separating the mercury globules are quantities of electrolyte 30 and 31. Beyond the end globules of mercury, electrolyte 32 and 33 are disposed. The electrolyte may be any one of a number of materials either acid or alkaline or even organic materials. However, a solution of chemically pure surphuric acid of about 30% concentration has been found to be highly effective. Polyvinyl alcohol in about .17% may be present also and increases the viscosity of the acid. Other materials to increase viscosity may be used. Beyond electrolyte 32 in the direction of constriction 18 is mercury 34 within chamber 21. Beyond electrolyte 33 is mercury 35 within chamber 20. Adjacent bodies of electrolyte and mercury are separated by interfaces as indicated in the drawing. The curvature of these interfaces is generally a function of the surface tensions of the liquid phases and also of the size and nature of the solid phase consisting of the envelope. No attempt is made to show accurately the curvature of the interfaces. The length of each of the mercury globules 26 to 28 inclusive is generally unimportant within wide limits.

Chamber 20 is sealed by flexible end wall 37. This end wall may be of the same material as envelope 10 or may be rubber, mica, or some thin metal such as iron or other material, which will not alloy with mercury and is inert to the contents. Mica has been found to be particularly desirable because of its impermeability and, due to its lamellar nature, may be readily split to any desired fineness. Thus a thin mica diaphragm somewhat less than one thousandth of an inch may be used.

In order to seal the mica to the envelope, sleeve 38 of any suitable material inert to mercury may be used. Sleeve 38 may be made of Plexiglas or Lucite, these being convenient because of their thermoplastic characteristics. Sleeve 38 is sealed to the outside of envelope 10 with any suitable cement. Thus a cement known in the trade as Pyseal has been used. This cement has a synthetic resin base. However, other cements inert to mercury and adherent to glass may also be used.

Sleeve 38 has inner annular flange 39 bearing against the free end of the envelope at chamber 20. Thus diaphragm 37 may be sealed to the end of sleeve 38. The sealing material for this joint may also be any one of a number of cements such as Pyseal or Glyptal cement. The advantages of cement seals over glass resides in their convenience and the fact that no elevated temperature for effecting the seal is necessary. The mica diaphragm itself is preferably just large enough to provide annular extension 40 beyond sleeve 38 for a good foothold for the cement joint. The drawing shows, in exaggerated form, the cemented surfaces.

In practice, the glass envelope and sealed end for chamber 20 with the diaphragm are all prepared prior to filling the same with liquid. Thereafter, the envelope is exhausted of its air content, the exhaust end being at 24. The degree of vacuum to which exhaustion is carried may vary within wide limits, depending upon desired characteristics, and will generally determine the amount of air trapped at the diaphragm end of the envelope after the entire device is completed. In practice, a minute quantity of air at this end of the device is desired and this quantity of air may be accurately controlled by the degree of vacuum to which the device is exhausted preliminary to filling. Thus the envelope may be exhausted to a pressure of about 20 to 30 microns or higher if desired. Thereafter, the envelope is maintained vertically and mercury is thereupon permitted to fill the entire envelope. When the mercury rises in the envelope, remanent air will form a butble and be trapped at the diaphragm end. This air bubble is small and generally not visible to the naked eye. It will be found that, after completion and sealing of the entire device, the bubble will remain at the diaphragm end irrespective of the position of the envelope.

Excess mercury in bore 16 is withdrawn by a pipette and electrolyte and mercury introduced to form alternate bodies as shown. Chamber 21 is filled with mercury, constriction 22 being small enough so that capillary force prevents the mercury from going into chamber 23. Chamber 23 contains air or any other gas at any desired pressure. The pressure in chamber 23 may be conveniently atmospheric or somewhat greater or less and constriction 24 sealed with cement 42. It is understood of course, that the gas pressure in chamber 23 may be any desired amount.

Lead 43 passes through seal 42 and chamber 23 and extends into constriction 22 to make contact with mercury 34. The lead is preferably of platinum or other metal inert to mercury. In order to aid in maintaining mercury body 34 in chamber 21, lead 43 may have end 44 formed as a fine coil spring or may be kinked. This tends to increase the capillary action and is more fully disclosed and claimed in my application Ser. No. 767,507, now Patent No. 2,454,497, issued November 23, 1948. The other end of the electrometer is similarly provided with lead 26 which may extend between sleeve 38 and envelope 10 beyond the edge of the envelope and into chamber 20. This lead is also preferably of platinum. The lead wires may be of any suitable gauge and in practice may have a diameter of about one or two thousands of an inch. The parts of the leads outside of the envelope are so disposed as to permit of envelope vibration.

A transducer such as described above may be made so that the axial length along the axis of the envelope is of the order of about ½". The entire mass of the transducer including contents and seals, can be quite small compared to conventional transducers. A device having the dimensions previously given will have a mass of a fraction of a gram (about .050 in the example above) this being of the same order or even less than the mass of a conventional stylus. It is evident therefore that the force required to oscillate the transducer is no greater and generally substantially less than required to move the stylus and is generally small in comparison to other types of transducers.

The transducer is mounted upon stylus 45 of any type desired. Thus stylus 45 as shown has tip 46 for engaging a record groove and extends upwardly at an angle. Tip 46 is joined to horizontal portion 47 and the end of the stylus is locked or rigidly mounted in any desired fashion in vertical rocker pin 48. This pin may be separate from the stylus or be integral therewith. Other kinds of styli may be used depending upon groove depth and angle, record material, etc.

Rocker pin 48 is mounted vertically as shown and the ends are clamped in flexible sleeves. These sleeves are indicated by numerals 57 and 58 respectively and are disposed above and below the stylus. The sleeves may be formed of small pieces of rubber tubing. The rubber tubing itself may be clamped by metal blocks 60 and 61 having suitably shaped portions for embracing the rubber tubing. The two blocks are bolted together by screws 63 and 64. The blocks may be of metal such as brass or iron if it is necessary to provide substantial mass. However, these blocks may be of plastic material and the mass may be adjusted to any desired value. Blocks 60 and 61 have cut-out region 65 to accommodate the stylus and transducer unit.

Disposed upon horizontal portion 47 of the stylus is the transducer unit. The transducer unit is cemented or fastened in any other suitable manner to the stylus. While the transducer may be mounted at any portion thereof, a convenient and desirable location for the mounting region is at or near elbow 11. It is preferred, although not essential, to have the transducer mounted so that the two arms of the transducer extend around a point at or in proximity to the center of rotation of the stylus at the rocker pin. It is clear that the axis of elbow 11 will therefore be parallel to and preferably coincident with the axis of pin 48. The transducer element is conveniently disposed above horizontal portion 47 of the stylus but may be disposed below if desired.

Blocks 60 and 61 are also bolted by screws 63 and 64 to base member 68 preferably of metal or other material having suitable mass. Base member 68 has portion 70 extending down, as seen in Figure 2, below the horizontal portion of the stylus. Portion 70 of the base is slotted or cut away at 71 in order to clear the elbow portion of the stylus. Slotted portion 71 is dimensioned so that the stylus will have sufficient clearance to permit proper stylus action during reproduction.

The mounting of the transducer so far provides for inertia operation only. In order to supplement this type of operation, the following additional means are provided. Cemented to mica diaphragm 37 is rubber or other flexible disc 73. Bearing against the outer surface of disc 73 is tip 75 of finger 76 suitably bolted or otherwise rigidly attached as at 77, to the base block. Finger tip 75 rests against coupling disc 73 and is relatively stationary with respect to the stylus and transducer. By having screw 77 as the fastening means it is possible to adjust the pressure of finger tip 75 upon the transducer head.

It is clear that all frequencies, lateral movement of the stylus tip will oscillate the transducer. At low frequencies, transducer operation by way of inertia action will not provide sufficient output. However, the bodily movement of the transducer with respect to finger tip 75 will provide a mechanical action. Thus low frequencies will be transmitted to the liquids within the envelope through flexible discs 73 and 37. By controlling the characteristics of diaphragm 37 and disc 73 and pressure of finger tip 75 as well as its location on the diaphragm, it will be possible to determine the region in the frequency range at which one type of action will give way to the other type of action as far as effective transducer output is concerned. As shown, finger tip 75 touches the diaphragm somewhat off center. This may be varied depending upon various physical factors.

For most conventional phonograph application such as 78 R. P. M. records, it is desirable to provide low frequency attenuation somewhat below 60 cycles per second. This is generally done in order to eliminate rumble and other undesirable noise usually present. The low frequency attenuation for the entire transducer system may be conveniently obtained by resiliently mounting the entire transducer system on a tone arm. Thus referring to Figure 2 it will be noted that the entire transducer system is mounted by leaf springs 80 and 81, riveted or otherwise attached to the top of the transducer base and extending to portion 82 of a tone arm. Springs 80 and 81 may be attached to tone arm 82 in any desired manner. Springs 80 and 81 are preferably so designed that the mass of the entire transducer system, this being of course below springs 80 and 81 as seen in Figure 2, cooperates with the springs so that reduced transducer action will occur below 70 cycles per second or below any other desired limit. It is necessary for the entire transducer system to have sufficient mass to provide for adequate tracking and to provide for actuation of an automatic record changer, if provided in such devices. Since the transducer as a whole, including the base, thus requires substantial mass in order to permit satisfactory inertia action, it will be found that springs 80 and 81 must have corresponding elasticity. The type of springs and determination of characteristics are rather simple and well within the scope of any one skilled in the art.

In the design of a transducer embodying the present invention, it is desirable to proportion the capillary chambers and contents so that a desirable value of transition frequency will occur for inertia operation. Preferably the resonant frequency of diaphragm 37 is below this inertia drive cutoff. Then the finger adjustment and resilient disc are so selected as to provide the proper cut-in frequency for positive drive. In general, this may be determined rather easily by simple experiment.

It will be apparent that the dimensions of the various chambers, bores and constrictions will have a substantial effect upon frequency response characteristics of the transducer. Thus when the transducer operates with mechanical action, this occurring at low frequencies, vibratory energy is transmitted longitudinally from finger tip 75 thru the resilient coupling and wall to the end of the liquid column. The liquid column between end wall 37 and constriction 22 acts to transmit vibratory energy. The greater the number of mercury globules the longer will be the liquid path and the greater will be the attenuation of the vibratory energy along the liquid path. Thus there will be a difference between moving the envelope relative to the liquid or vice versa. During this mechanical action, the mass of mercury in chamber 20 will have some effect upon the response characteristics. The amount of gas or air present in chamber 23 also has a bearing and this amount will of course be correlated with the volume of the entire capillary device.

Thus as an example, in the electrometer previously referred to, with the dimensions given, the capillary volume was about .05 cc. When the envelope was evacuated to a pressure of between about 20 and 30 microns, the volume of the air bubble at the flexible wall was calculated to be about $1.5 \times 10^{-6}$ cc. assuming substantially atmospheric pressure in chamber 23. In practice, it may be desirable to have the gas pressure in chamber 23 somewhat greater than atmospheric to improve low frequency operation. This may be readily obtained by chilling the electrometer prior to sealing at 24.

When the transducer element is operating as an inertia device, the shape, dimensions and volume of the various chambers, bores and constrictions will also have some effect upon the output characteristics. It is clear, that the mercury in chambers 20 and 34 will have substantial inertia. Thus the volume of chamber 20 and chamber 34 as well as the diameter of constriction 18 and bore 16 will have some effect on the high frequency response.

However, substantial tolerances in the various dimensions and volumes as well as filling pressure or vacuum are possible without serious variation in the output characteristics. The transducer element is subject to mechanical and inertia action at all frequencies. However the effectiveness of the capillary electrometer as a transducer: i. e. a converter of energy from one form to another, will be due primarily to mechanical action over the low frequency portion of the range and to inertia action over the high frequency portion of the range. No sharp dividing line between these two types of action will exist normally although it is possible to design the entire transducer system so that a sharp dividing line will separate these two types of action. Under normal conditions however, such a sharp frequency division between these two types of action is not required.

The mounting of the entire unit on a tone arm may be varied to accommodate different types of records. Thus the mounting shown in Figures 2 and 3 will generally be satisfactory for records turning at 78 R. P. M. and usually having grooves of a depth of about .010". Where slow speed records turning at about 28 or 33⅓ R. P. M. are used, it is generally the practice to have fine grooves of about .001 or .002".

For reasons well known to those skilled in the art, it is necessary to provide a sharp stylus tip (small radius of curvature) and use low needle pressures of the order of about 5 or 6 grams in order to prevent breakdown of the wall between adjacent grooves in fine groove records. A pick-up of the type embodying the present invention will be found particularly desirable for this type of reproduction. With such records, it is generally desirable to be able to reproduce frequencies down to as low as 40 cycles per second. Hence in such case, the transducer as a whole may be more or less rigidly secured in tone arm portion 82. In such case, the tone arm may be light and be suitably counterbalanced to provide desired needle pressure.

It is possible to have the portion of the tone arm carrying the pick-up unit detachable from the remainder of the tone arm so that two tone arm units may be used for fine groove records or records turning at 78 R. P. M. Other means for changing from one pick-up to another may be relied upon.

For work on fine groove records, it may be desirable to change the diaphragm material and thickness. In all instances, any impermeable flexible sheet material, either metallic or non-metallic may be used instead of mica. The material should resist not only mercury but the electrolyte, such as sulphuric acid in this instance. It has been found that creepage of acid may occur along the glass.

It is clear that a device embodying the present invention is mechanically simple and has highly desirable properties as far as transmission of vibration is concerned. Due to inertia action at high frequencies, it is possible to have a transducer embodying the present invention operate properly and provide high output over frequency ranges far in excess of those considered possible at present, without elaborate complications.

The invention so far has been described in connection with a transducer for phonograph work. It is clear that a transducer for converting sound energy into electrical energy utilizing the invention may also be devised. Thus referring to Figure 4, there is shown in diagrammatic form a microphone utilizing the present invention. Thus diaphragm 90 is adapted to be suitably energized by sound. While the diaphragm is shown as being of the conical type, other types such as a simple flat disc may also be used. The edge of the diaphragm may be attached to rigid support 91. It is possible to have a flexible coupling between the edge of the conical diaphragm and support 91 or the connection may be by simple clamping. Inasmuch as such diaphragm constructions are well known, a detailed description of the various forms which the diaphragm and its mounting may assume is not deemed to be essential.

Diaphragm 90 has apex portion 92 (this would correspond to the central portion of a flat diaphragm). Portion 92 carries straight capillary electrometer 95. Electrometer 95 consists of an envelope of straight formation but otherwise generally similar to the electrometer shown in Figure 1. The end of the electrometer envelope is provided with a resilient wall portion and bearing upon this wall portion is finger 96 rigidly supported in any suitable manner. For all practical purposes, base 91 and the support for finger 96 are substantially identical and may conveniently be considered one basic structure. While the finger cooperating with the flexible wall portion is shown at the end of the electrometer outside of the cone, this relationship may be reversed and instead the finger and flexible wall portion may be disposed within the outline of the cone.

When sound waves impinge upon the diaphragm the electrometer envelope will be vibrated. At high frequencies, inertia action in the capillary transducer element will be satisfactory. At low frequencies when output due to inertia action falls off, mechanical action through the rigid finger is effective to provide transducer action. It is understood that the diaphragm is mounted so that it will be provided with suitable means so that it tends to assume a normally stationary position. From this normal position, sound waves will move the diaphragm in either direction. It is thus possible to provide a microphone frequency response as great as may be found desirable. If a low frequency overall cut-off is desired below which no transducer action is to be effective then suitable spring or elastic mounting for the base may be provided.

The transducers heretofore described are principally useful for converting sound energy into electrical energy. While a capillary electrometer is a reversible type of transducer and while the direction of transducer action may be reversed, it will be found that most effective use of the device is in the direction previously indicated, namely from sound or mechanical energy to electrical energy.

Due to the small physical size and compact structure of devices embodying the invention, extended fields of use will be found therefor.

What is claimed is:

1. A transducer having both inertia and mechanical modes of operation, comprising a base, a vibratable member carried on said base, a capillary electrometer including an elongated sealed insulating envelope containing interface forming liquids and current lead-ins, said envelope being predominately of rigid material but having a resilient wall portion in pressure communication with the interface forming liquids, means for coupling said vibratable member and the rigid part of said envelope to cause said envelope to move longitudinally thereof so that, at higher frequencies, inertia tends to maintain the liquid contents fixed in space, thus providing an inertia mode of operation as the dominant capillary transducer action, a finger carried by said base and so coupled to said resilient wall portion, that, at lower frequencies, the positive movement of said envelope causes said finger to vibrate said resilient wall portion and thus provides a mechanical mode of operation as the dominant capillary transducer action, the mechanical mode of operation growing smaller and the inertia mode of operation growing larger as the frequency increases from a low to a high value.

2. The transducer according to claim 1 wherein the resilient wall portion of said electrometer is in contact with a liquid.

3. The transducer according to claim 1 wherein the coupling between said vibratable member and the rigid part of said envelope is rigid whereby said envelope moves with said vibratable member throughout the entire range of frequencies impressed upon said vibratable member.

4. A transducer having both inertia and mechanical modes of operation, comprising a base, a vibratable member including a phonograph stylus carried on said base, a capillary electrometer including an elongated sealed envelope containing interface forming liquids and current lead-ins, said envelope being predominantly of rigid material but having a resilient wall portion in pressure communication with said interface forming liquids, means for rigidly coupling said stylus and the rigid part of said envelope to cause said envelope to move longitudinally thereof so that, at higher frequencies, inertia tends to maintain the liquid contents fixed in space, thus providing an inertia mode of operation as the dominant capillary transducer action, a rigid finger carried by said base and so coupled to said resilient wall portion, that, at lower frequencies, the positive movement of said envelope causes said finger to vibrate the resilient wall portion and thus provides a mechanical mode of operation as the dominant capillary transducer action, the mechanical mode of operation growing smaller and the inertia mode of operation growing larger as the frequency increases from a low to a high value.

5. The transducer according to claim 4 wherein the electrometer is secured directly upon said stylus, said electrometer having a mass of about the same order as that of the stylus.

6. The transducer according to claim 4 wherein said resilient wall portion comprises a thin flexible diaphragm and a layer of rubber-like elastic material with said rigid finger resting upon said rubber-like material.

7. A transducer having both mechanical and inertia modes of operation, comprising a base, a stylus having one end resiliently secured to said base and having a stylus tip for engagement with a record groove, a capillary electrometer including an elongated sealed insulating envelope containing interface forming liquids and current lead-ins, said envelope being predominantly of rigid material but having a resilient wall portion in pressure communicating with said interface forming liquids, means for securing the rigid electrometer envelope portion to said stylus to cause said envelope to move longitudinally thereof so that, at higher frequencies, inertia tends to maintain the liquid contents fixed in space thus providing an inertia mode of operation as the dominant capillary transducer action, a finger carried by said base and so contacting said resilient wall portion that at lower frequencies the positive movement of said envelope causes vibratory movement of said resilient wall portion by said finger and thus provides a mechanical mode of operation as the dominant capillary transducer action, the mechanical mode of operation growing smaller and the inertia mode of operation growing larger as the frequency increases from a low to a high value.

8. A transducer having inertia and mechanical modes of operation, comprising a base, an elongated member having one end attached to said base and having the other end free for lateral vibration, a capillary electrometer including an elongated sealed insulating envelope containing interface forming liquids and current lead-ins, said envelope being predominantly of rigid material but having a resilient wall portion in pressure communication with said interface forming liquids, said resilient wall portion being at one end of said electrometer envelope, means for attaching the rigid portion of said envelope to said elongated member, said elongated envelope having its length substantially perpendicular to the length of the elongated member at the region of attachment, a rigid finger carried by said base and extending to said resilient wall portion, said envelope moving longitudinally thereof so that, at higher frequencies, inertia tends to maintain the liquid contents fixed in space thus providing an inertia mode of operation as the dominant capillary transducer action, at lower frequencies the positive movement of the envelope causing the relatively stationary finger to vibrate the resilient wall portion and thus provide a mechanical mode of operation as the dominant capillary transducer action, and the mechanical mode of operation growing smaller and the inertia mode of operation growing larger as the frequency increases from a low to a high value.

9. The transducer according to claim 8 wherein said electrometer envelope is curved, said envelope being secured so that the center of curvature is in the neighborhood of the fixed end of said vibratable member.

10. A capillary electrometer comprising an elongated envelope having a capillary channel therein and having chambers at the two ends, said envelope being of lead-free glass with a mica diaphragm at one end forming a chamber wall, mercury and a solution of sulphuric acid in said envelope for providing at least one electrometer interface, and a current lead-in at each end of said envelope and extending from the outside into a liquid.

11. The electrometer according to claim 10 wherein a small quantity of alcohol is present in the acid.

12. The electrometer according to claim 10 wherein a trace of polyvinyl alcohol is present in the acid.

13. A capillary electrometer comprising an elongated lead-free glass envelope having a capillary channel therein and having chambers at two ends, mercury and a solution of sulphuric acid in said envelope for providing at least one electrometer interface, a current lead-in at each end of said envelope extending from the outside into a liquid, a cold-formed seal at one end of the envelope and a flexible diaphragm sealed with plastic material at the other end, said plastic sealing material and diaphragm being selected so that they are substantially inert to mercury.

14. The electrometer according to claim 13 wherein a plastic sleeve is provided at the end of the envelope containing the diaphragm, said sleeve serving to maintain the diaphragm in position.

15. The structure according to claim 13 wherein a gas chamber is provided at the end of the envelope remote from the flexible diaphragm.

16. A capillary electrometer according to claim 13 wherein said envelope contains gas at the diaphragm end, said gas being formed from the gas content within said envelope when the pressure has been reduced to about 25 microns.

17. The capillary electrometer according to claim 13 wherein said envelope has gas at a pressure somewhat above atmospheric at said one end of the envelope.

18. A transducer comprising a vibratable diaphragm, an elongated capillary electrometer, said electrometer comprising an elongated insulating rigid envelope containing interface forming liquids therein, said envelope including a resilient end wall, means for securing said envelope at the central portion of said diaphragm with the envelope axis substantially coincident with a line passing through the center of the diaphragm and symmetrical with respect thereto and a rigid finger mechanically coupled to said resilient end wall.

19. A capillary electrometer for use in converting sound waves into electrical potentials comprising an elongated, lead-free, glass envelope having a capillary channel therein and having chambers at the two ends, interface forming liquids therein, current lead-ins at the ends of said envelope for completing an electrical circuit from the outside to said interface forming liquids, a flexible diaphragm for sealing one end of said envelope, means for sealing the other end of said envelope, said envelope having a volume of the order of about .05 cc. and containing at the diaphragm end remanent gas formed of the gas remaining in the envelope upon exhaustion to a pressure of about 25 microns and compressed by the liquid content of said envelope during filling subsequent to the exhausting.

HOWARD W. ASHTON.

REFERENCES CITED

The following references are of record in the file of this patent:

UNITED STATES PATENTS

| Number | Name | Date |
|---|---|---|
| 669,149 | Crehore | Mar. 5, 1901 |
| 1,738,988 | De Forest | Dec. 10, 1929 |
| 1,819,083 | Edwards | Aug. 18, 1931 |
| 1,977,433 | Dunning | Oct. 16, 1934 |
| 2,045,427 | White | June 23, 1939 |
| 2,279,815 | Dressel | Apr. 14, 1942 |
| 2,340,777 | Stanley | Feb. 1, 1944 |
| 2,407,363 | Bussey | Sept. 10, 1946 |
| 2,416,978 | Burgess | Mar. 4, 1947 |
| 2,431,367 | Bussey | Nov. 25, 1947 |
| 2,433,177 | Waino | Dec. 23, 1947 |
| 2,449,478 | Herzog | Sept. 14, 1948 |
| 2,454,496 | Ashton | Nov. 23, 1948 |
| 2,454,497 | Ashton | Nov. 23, 1948 |